US010929356B2

United States Patent
Nishikawa et al.

(10) Patent No.: US 10,929,356 B2
(45) Date of Patent: Feb. 23, 2021

(54) DETECTION OF HIDDEN DATA CO-OCCURRENCE RELATIONSHIPS

(71) Applicant: INTERNATIONAL BUSINESS MACHINES CORPORATION, Armonk, NY (US)

(72) Inventors: Yuriko Nishikawa, Tokyo (JP); Masaki Saitoh, Yokohama (JP); Yoshinori Tahara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 15/996,904

(22) Filed: Jun. 4, 2018

(65) Prior Publication Data
US 2019/0370343 A1 Dec. 5, 2019

(51) Int. Cl.
  *G06F 16/18* (2019.01)
  *G06F 3/06* (2006.01)
  *G06F 16/17* (2019.01)
  *G06F 16/182* (2019.01)

(52) U.S. Cl.
  CPC ........ *G06F 16/1873* (2019.01); *G06F 3/0653* (2013.01); *G06F 16/1734* (2019.01); *G06F 16/1824* (2019.01)

(58) Field of Classification Search
  CPC ............. G06F 16/1873; G06F 16/1824; G06F 16/1734; G06F 3/0653
  USPC ........................................................ 707/694
  See application file for complete search history.

(56) References Cited

U.S. PATENT DOCUMENTS

| 6,112,265 A * | 8/2000 | Harriman ................. G06F 3/061 710/39 |
| 9,659,042 B2 | 5/2017 | Puri et al. |
| 2008/0004841 A1* | 1/2008 | Nakamura ............ G06F 11/008 702/186 |
| 2011/0113117 A1* | 5/2011 | Genest ................ G06F 11/3476 709/217 |
| 2012/0090035 A1* | 4/2012 | Mehta ..................... G06Q 10/08 726/26 |
| 2013/0332423 A1* | 12/2013 | Puri ....................... G06F 16/219 707/687 |

(Continued)

FOREIGN PATENT DOCUMENTS

| JP | 2001142748 A | 5/2001 |
| JP | 2005234661 A | 9/2005 |
| JP | 2007109016 A | 4/2007 |

OTHER PUBLICATIONS

Wikipedia, "Data lineage," https://en.wikipedia.org/wiki/Data_lineage, Printed on Apr. 4, 2018, pp. 1-14.

(Continued)

*Primary Examiner* — Robert W Beausoliel, Jr.
*Assistant Examiner* — Arthur Ganger
(74) *Attorney, Agent, or Firm* — Robert D. Bean

(57) ABSTRACT

Hidden data co-occurrence relationships may be detected by a computer-implemented method, including monitoring data processing events on one or more server computers, gathering co-occurrences between a plurality of the data processing events, and generating one or more lineages between a plurality of directories associated with the plurality of the data processing events based on the gathered co-occurrences.

19 Claims, 7 Drawing Sheets

(56) References Cited

U.S. PATENT DOCUMENTS

2014/0019423 A1   1/2014  Liensberger et al.
2017/0139929 A1*  5/2017  Aggarwal ........... G06F 16/2471

OTHER PUBLICATIONS

Deng et al., "The Data Civilizer System," CIDR 2017, 8th Biennial Conference on Innovative Data Systems Research, Jan. 8-11, 2017, Chaminade, California, US, pp. 1-7.

* cited by examiner

| | $S_AD1$ | $S_AD2$ | $S_AP1$ | $S_AP2$ | $S_BT1$ | $S_BP1$ |
|---|---|---|---|---|---|---|
| $S_AD1$ | - | 10 (2.4) | 9 (2.2) | | 2 (2.5) | |
| $S_AD2$ | | - | 8 (2.8) | | 1 (3) | 2 (2) |
| $S_AP1$ | 1 (4) | | - | 4 (2.8) | 1 (4) | |
| $S_AP2$ | 2 (3) | | 1 (2) | - | | |
| $S_BT1$ | | 5 (2.1) | | 6 (2.4) | - | 1 (3) |
| $S_BP1$ | | 3 (3.3) | | 1 (3) | 2 (3) | - |

600

DETECTION OF HIDDEN DATA CO-OCCURRENCE RELATIONSHIPS

BACKGROUND

The present invention relates to detection of hidden co-occurrence relationships.

Data lineage may indicate an origin of data and events that occurred with the data. The lineage may be utilized to investigate the origin of improper data, to confirm a range on which the modification to data has an influence, and to identify where a copy of specific data is located, etc.

Programs that deal with data must store such lineages. However, the location to which the data is written is determined during the execution of the program, and may not be known from a static definition of the program. Further, the program or a developer thereof may not know the exact operations of a destination of an API call and where the data is stored within the destination.

In order to automatically store such lineages, it may be necessary to fully analyze the operations of the program and the destinations of API calls during the execution, which may require enormous time and computational resources, and may not be practical.

SUMMARY

According to an aspect of the present invention, provided is a method, comprising: monitoring data processing events on one or more server computers, gathering co-occurrences between a plurality of the data processing events, and generating one or more lineages between a plurality of directories associated with the plurality of the data processing events based on the gathered co-occurrences.

The forgoing aspect may also include an apparatus including a processor or a programmable circuitry and one or more computer readable storage mediums collectively storing program instructions that, when executed by the processor or the programmable circuitry, cause the processor or the programmable circuitry to perform the method, and a computer program product storing instructions embodied on a computer readable storage medium or programmable circuitry, that, when executed by a processor or the programmable circuitry, cause the processor or the programmable circuitry to perform the method of the above aspect. The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
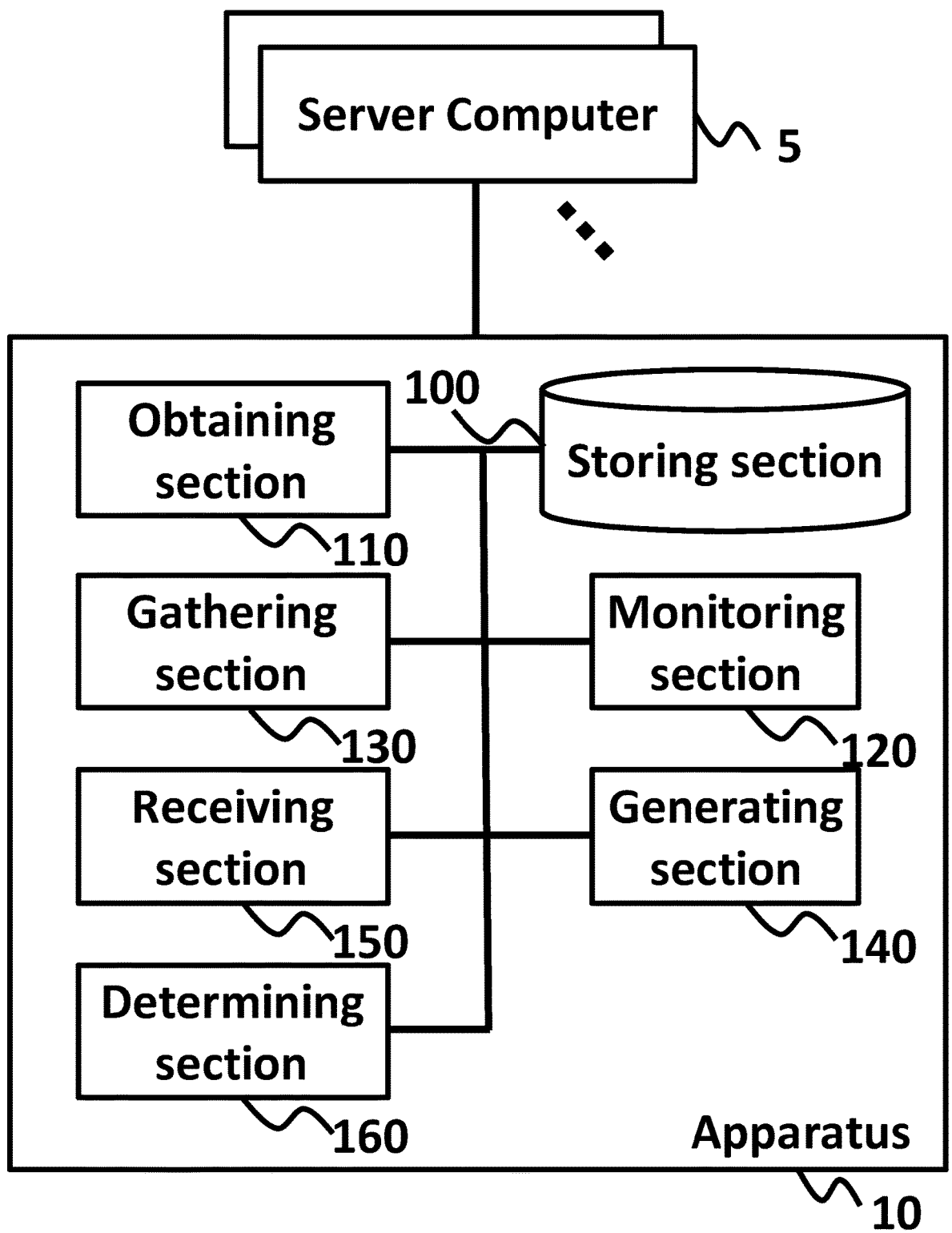
FIG. 1 shows an exemplary configuration of a system 1, according to an embodiment of the present invention.

FIG. 1 shows an exemplary configuration of a system 1, according to an embodiment of the present invention. The system 1 comprises one or more server computers 5 and an apparatus 10. The one or more server computers 5 (which may be hereinafter collectively referred to as "server computer 5") may process data. In an embodiment, the server computer 5 may implement a cloud platform such as IBM Cloud™ (IBM Cloud™ and all IBM Cloud™ based trademarks and logos are trademarks or registered trademarks of International Business Machines Corporation and/or its affiliates).

The apparatus 10 may generate a lineage between directories that contain data processed by the server computer 5. The apparatus 10 may generate the lineage by gathering co-occurrences between data processing events occur in the server computer 5.

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, an obtaining section 110, a monitoring section 120, a gathering section 130, a generating section 140, a receiving section 150, and a determining section 160.

The storing section 100 may store information used for the processing that the apparatus 10 performs. The storing section 100 may also store a variety of data/instructions used for operations of the apparatus 10. One or more other elements in the apparatus 10 (e.g., the obtaining section 110, the monitoring section 120, the gathering section 130, the generating section 140, the receiving section 150, and the determining section 160) may communicate data directly or via the storing section 100, as necessary.

The storing section 100 may be implemented by a volatile or non-volatile memory of the apparatus 10. In some embodiments, the storing section 100 may store source data, data processing events, co-occurrences, and other data related thereto.

The obtaining section 110 may obtain test data. The test data may include one or more source data to be processed. The obtaining section 110 may provide each source data to the server computer 5. The obtaining section 110 may obtain other data necessary for operations of the apparatus 10.

The monitoring section 120 may monitor data processing events on the server computer 5. The data processing event may correspond to the processing of the source data by the server computer 5. In an embodiment, the monitoring section 120 may access the server computer 5, and detect the data processing events. In an embodiment, the monitoring section 120 may store the data processing events on the storing section 100.

The gathering section 130 may gather co-occurrences between a plurality of the data processing events. In an embodiment, the gathering section 130 may classify and count the data processing events that occur within a predetermined number of events after the other data processing event occurs. In an embodiment, the gathering section 130 may store the gathered co-occurrences in the storing section 100.

The generating section 140 may generate one or more lineages between a plurality of directories associated with the plurality of the data processing events based on the gathered co-occurrences. In an embodiment, the generating section 140 may generate lineages between two directories for which data processing events frequently co-occur according to the gathered co-occurrences. In an embodiment, the generating section 140 may store the generated lineages on the storing section 100.

The receiving section 150 may receive a request to provide a lineage related to a first directory from a client computer. In an embodiment, the receiving section 150 may receive a request including an identification of a first directory from the client computer.

The determining section 160 may identify the lineage related to the first directory according to the lineages generated by the generating section 140. In an embodiment, the determining section 160 may further determine one or more second directories that have a lineage with the first directory. The determining section 160 may provide the one or more second directory to the client computer.

Figure 2:
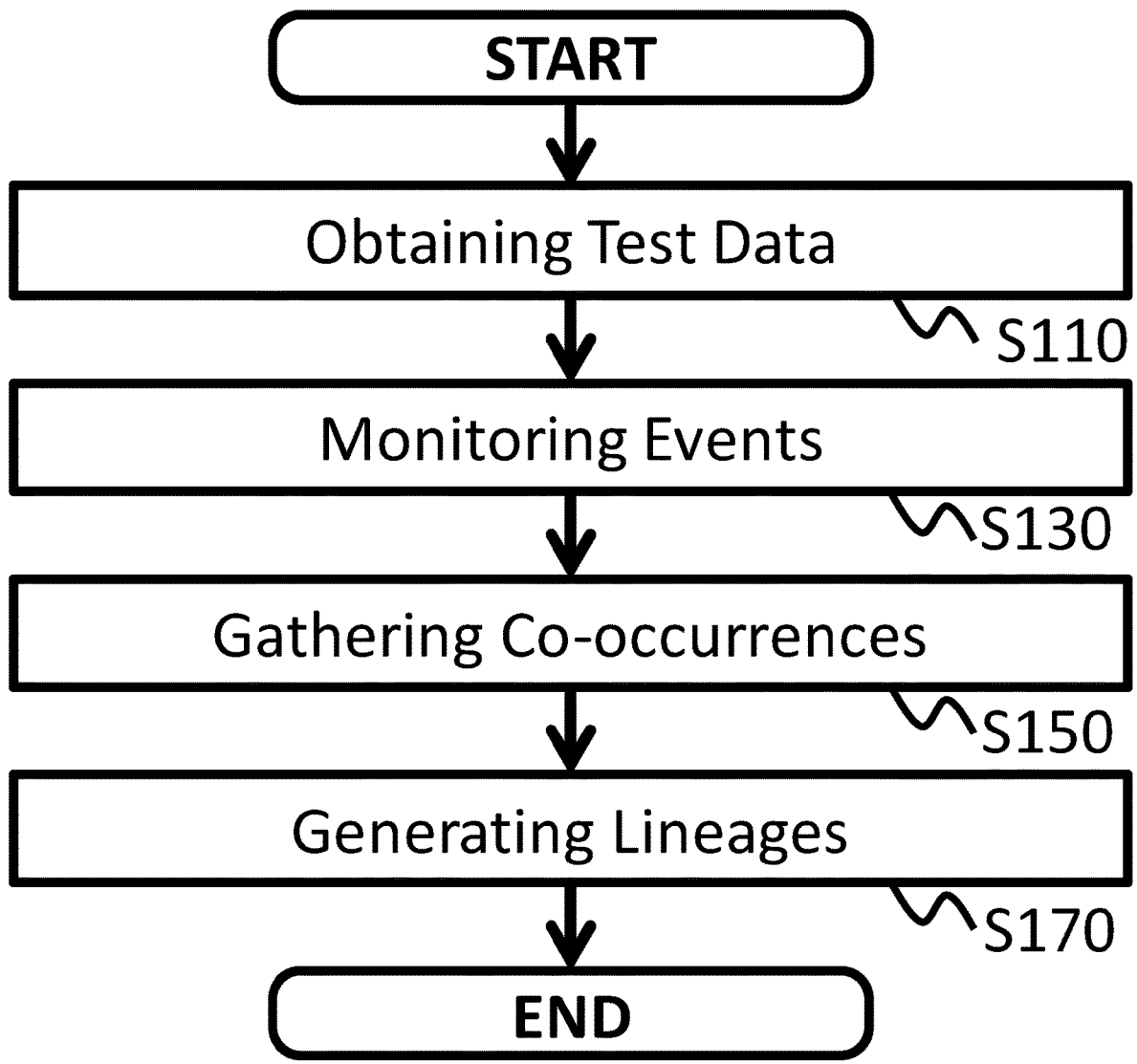
FIG. 2 shows a first operational flow according to an embodiment of the present invention.

FIG. 2 shows a first operational flow according to an embodiment of the present invention. The present embodiment describes an example in which an apparatus, such as the apparatus 10, performs operations from S110 to S170, as shown in FIG. 2 to generate the lineages.

At S110, an obtaining section, such as the obtaining section 110, may obtain test data including a plurality of source data. The obtaining section may provide each of the plurality of source data to one or more server computers, such as the server computer 5. The one or more server computers may process each of source data.

At S130, a monitoring section, such as the monitoring section 120, may monitor data processing events on the server computer after each source data is provided. In an embodiment, the monitoring section may access the server computer and store a part of all of the data processing events on a storing section, such as the storing section 100.

The operation of S130 may be performed for each of the plurality of source data. In an embodiment, the obtaining section may first provide one source data of the plurality of source data to the server computer, and then the monitoring section may monitor the data processing events caused by the one source data. After the monitoring section does not detect any data processing event for a predetermined time duration, the obtaining section may further provide the next source data of the plurality of source data.

The data processing event may an event where data is processed. In an embodiment, the data processing event may include at least one of writing of data, reading of data, inputting data, outputting data, and transforming data, where data may include a file, a directory, and a database. For example, the data processing events may include at least one of generation of a file, update of a file, reading of a file, update of a database, reading of a database, and use of a data pipe. The update and reading of the database may include an update and reading of a data table of the database.

In an embodiment, the monitoring section may store the data processing events by a URI including a directory. In the embodiment, the monitoring section may store the use of the data pipe on a server computer (e.g., the server 1) as "dtpipe://server1/pipeline2/pipe3" including information of a directory "dtpipe://server1/pipeline2/."

In the embodiment, the monitoring section may store the update of a file on the server 1 as "file://server1/var/xxx/yyy/zzz." The monitoring section may store a URI of a directory that contains the updated or generated file on the server 1 such as "file://server1/var/xxx/yyy/" instead of the URI of the file itself.

Sometimes new files are generated in a child directory of an existing parent directory. The monitoring section may store generation of a file in a child directory such as "file://server1/var/xxx/yyy/zzz/new" as the parent directory "file://server1/var/xxx/yyy/" to associate the files in the child directory with the files in the parent directory. Thereby the apparatus may treat all files in the parent directory in one group.

In the embodiment, the monitoring section may store the update of the data table in a database on the server 1 as "dbtable://server1/db2/db2inst1/employee." The monitoring section may store the update of the data table for column base. For example, the monitoring section may store the update of column XX of the data table in the database on the server 1 as "dbtable://server1/db2/db2inst1/employee_XX."

The monitoring section may be implemented by at least one of filesystem monitoring software, database monitoring software, and data pipe monitoring software. In an embodiment, the monitoring section may monitor the generation of file and/or the update of the file using, for example, Filesystem in Userspace (FUSE). In an embodiment, the monitoring section may store the data processing events with timestamps at which the data processing events occur.

Figure 3:
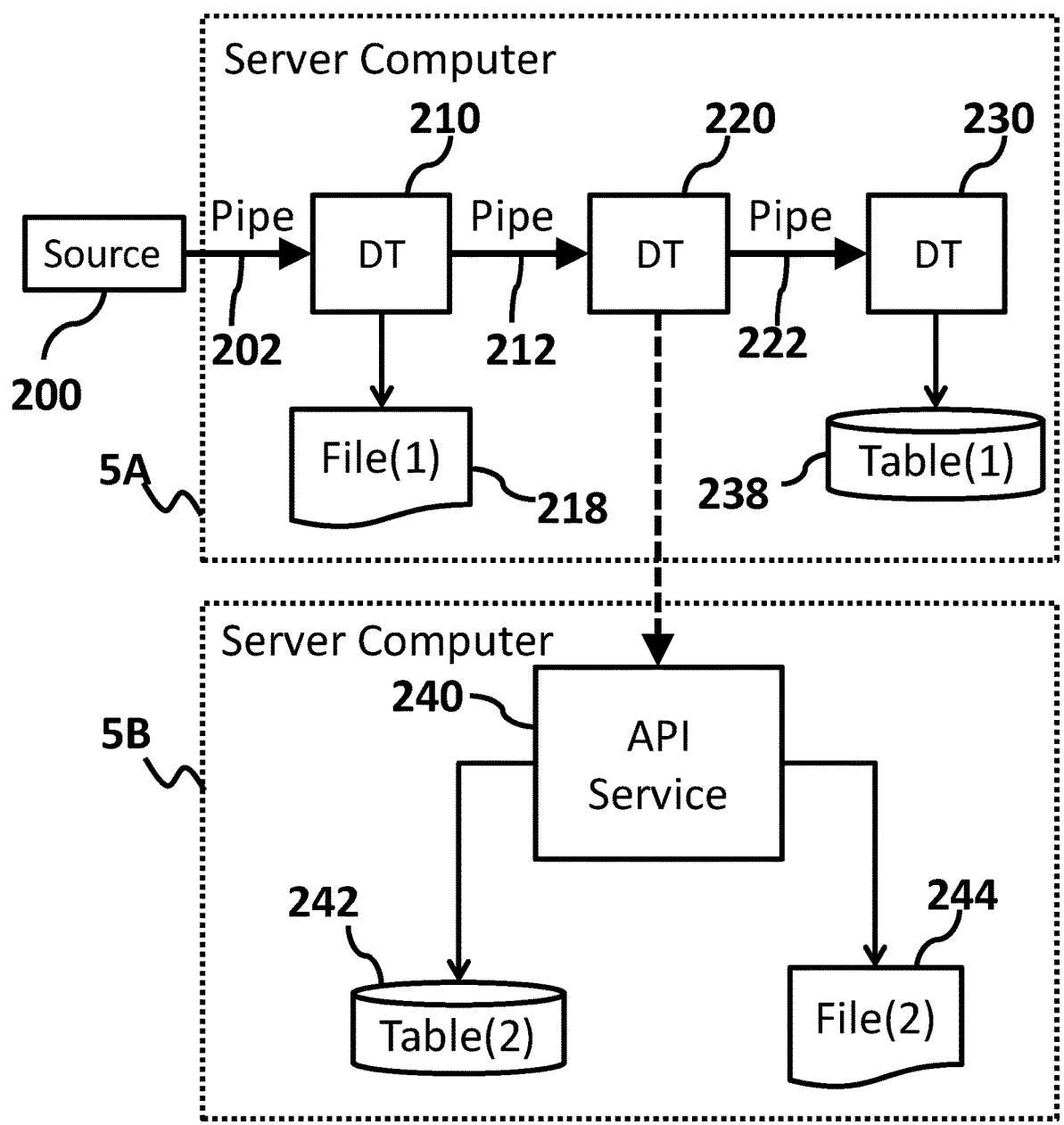
FIG. 3 shows an exemplary data flow, according to an embodiment of the present invention.

FIG. 3 shows an exemplary data flow, according to an embodiment of the present invention. In the embodiment of FIG. 3, a system includes two server computers 5A and 5B. The system provides a data pipeline function with a plurality of data transformers (e.g., three data transformers in FIG. 3). Each data transformer independently processes data and provides the processed data to a downstream data transformer.

An obtaining section, such as the obtaining section 110, provides source data 200 to the server computer 5A. The source data 200 is provided to a data transformer (shown as "DT") 210 via data pipe 202. The data transformer 210 processes the source data 200, and generates or updates file 218 (shown as "File (1)"), and outputs processed data to a data transformer 220.

The data transformer 220 receives data from the data transformer 210 via a data pipe 212, and processes the received data. The data transformer 220 may provide the processed data to a data transformer 230 and to an API service 240 (e.g., a REST API service) in the server computer 5B, which is remote from the server computer 5A.

The data transformer 230 receives data from the data transformer 220 via a data pipe 222, and processes the received data. The data transformer 230 generates or updates a data table 238 (shown as "Table (1)") of a database in the server computer 5A.

The API service 240 receives data from the data transformer 220, and processes the received data. The API service 240 generates or updates a data table 242 (shown as "Table (2)") of a database in the server computer 5B and a file 244 (shown as "File (2)").

In the embodiment of FIG. 3, a monitoring section, such as the monitoring section 120, may monitor use of the data pipes 202, 212, 222, update or generation of the files 218, 244, and update or generation of the data table 238, 242 as the data processing events, by accessing the server computers 5A, 5B.

In an embodiment, the monitoring section may generate a sequence of data processing events from the monitored data processing events, for each source data. In a specific embodiment of FIG. 3, the monitoring section may generate a sequence "$S_AP1$, $S_AD1$, $S_AP2$, $S_BT2$, $S_BD2$, $S_AP3$, $S_AT1$" for the source data 200. This sequence indicates that 7 data processing events "$S_AP1$", "$S_AD1$", "$S_AP2$", "$S_BT2$", "$S_BD2$", "$S_AP3$", and "$S_AT1$" have been detected by the monitoring section in this order.

Here "$S_A$" represents the server computer 5A, "$S_B$" represents the server computer 5B, "P1" represents a directory containing the pipe 202, "P2" represents a directory containing the pipe 212, "P3" represents a directory containing the pipe 222, "D1" represents a directory containing the file 218, "D2" represents a directory containing the file 244, "T1" represents a directory containing the data table 238, and "T2" represents a directory containing the data table 242. Thereby, for example, "$S_AP1$" represents that an event using the pipe 202 in the directory "P1" on the server computer 5A has occurred.

At S150, a gathering section such as the gathering section 130 may gather co-occurrences between the plurality of the data processing events monitored at S130. In an embodiment, the gathering section may gather a co-occurrence between a first data processing event, and a second data processing event that occurs within a first predetermined number of events after the first data processing event.

Figures 4, 5:
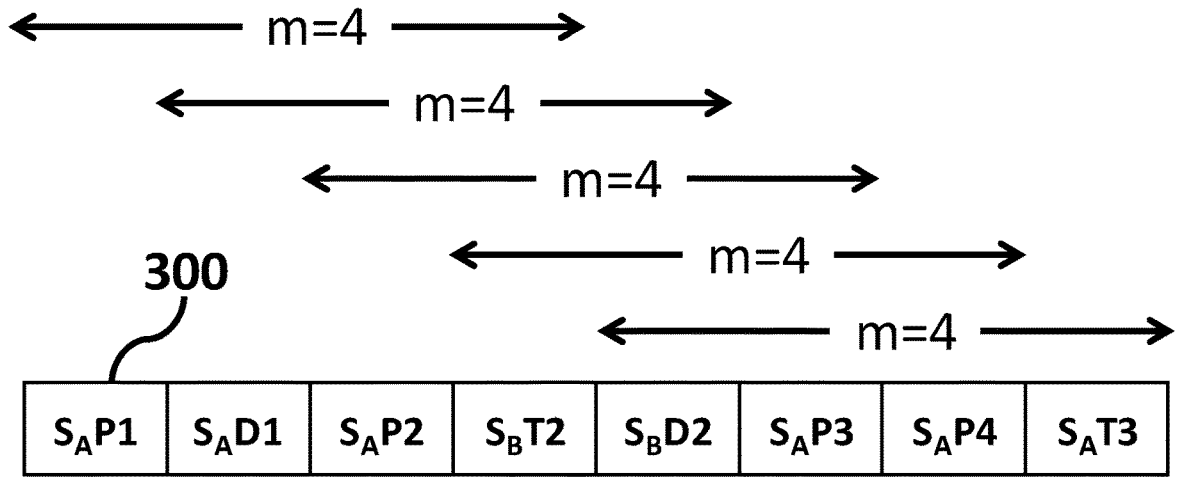
FIG. 4 shows a sequence of data processing events according to an embodiment of the present invention.
FIG. 5 shows an exemplary table representing co-occurrences, gathered by the gathering section, according to an embodiment of the present invention.

FIG. 4 shows a sequence 300 of data processing events according to an embodiment of the present invention. FIG. 4 describes a sequence 300 including "$S_AP1$, $S_AD1$, $S_AP2$, $S_BT2$, $S_BD2$, $S_AP3$, $S_AP4$, $S_AT3$." The sequence 300 is only an example and may not be relevant to the data flow of FIG. 3.

In the embodiment of FIG. 4, the predetermined number of events (shown as "m") is 4. Thereby, the gathering section may gather a co-occurrence between the data processing event "$S_AP1$" and the data processing event "$S_AD1$", which has occurred within 4 events (including "$S_AP1$" itself) after "$S_AP1$." Similarly, the gathering section may gather a co-occurrence between the data processing event "$S_AP1$" and the data processing event "$S_AP2$", and a co-occurrence between the data processing event "$S_AP1$" and the data processing event "$S_BT2$."

In the embodiment of FIG. 4, the gathering section may gather a co-occurrence between the data processing event "$S_AD1$" and the data processing event "$S_AP2$", a co-occurrence between the data processing event "$S_AD1$" and the data processing event "$S_BT2$", and a co-occurrence between the data processing event "$S_AD1$" and the data processing event "$S_BD2$."

The gathering section may also gather co-occurrences between "$S_AP2$" and "$S_BT2$", between "$S_AP2$" and "$S_BD2$", between "$S_AP2$" and "$S_AP3$", between "$S_BT2$" and "$S_BD2$", between "$S_BT2$" and "$S_AP3$", between "$S_BT2$" and "$S_AP4$", between "$S_BD2$" and "$S_AP3$", between "$S_BD2$" and "$S_AP4$", and between "$S_BD2$" and "$S_AT3$."

In an embodiment, the gathering section may gather co-occurrences by taking a time interval between the data processing events into consideration. In the embodiment, the second data processing event has to occur within a first predetermined number of events and within a predetermined time after the one data processing event. For example, the gathering section may refer to the timestamps and not gather a co-occurrence between the data processing event "$S_AP1$" and the data processing event "$S_BT2$" (occurring within m=4 events from "$S_AP1$") when determining that the time interval between "$S_AP1$" and "$S_BT2$" exceeds the predetermined time.

FIG. 5 shows an exemplary table 600 representing co-occurrences gathered by the gathering section, according to an embodiment of the present invention. The table 600 is only an example and may not be relevant to the sequence of FIG. 4.

In the embodiment of FIG. 5, the data processing event "$S_AD1$" co-occurs with the data processing event "$S_AD2$" 10 times, with the data processing event "$S_AP1$" 9 times, and with the data processing event "$S_BT1$" 2 times. In an embodiment, the gathering section may store the gathered co-occurrences such as represented by the table 600 in the storing section.

The gathering section may further calculate an average distance between two data processing events that co-occur. For example, when the number of events between "$S_AD2$" and "$S_AP1$" in 4 co-occurrences are 2, 3, 2, and 4, then the gathering section may calculate the average distance as (2+3+2+4)/4=2.75 (shown as "(2.8)" in FIG. 5) and store it as a part of the co-occurrence between "$S_AD2$" and "$S_AP1$."

In the embodiment of FIG. 5, the gathering section may gather co-occurrences of each data table, such as "T1." For example, the gathering section may count at least one of the update of the database and the reading of the data table "T1" with other data processing events, such as shown as "2(2.5)" for "$S_BT1$" and "$S_AD1$" in the table 600.

In another embodiment, the gathering section may count co-occurrences of at least one of the update of the database and the reading of the database for each column of the database with other data processing events. In such embodiment, the data processing event may be indicated as "$S_BT1C1$" that represents column "C1" of the data table "$S_BT1$." Thereby, the gathering section may gather co-occurrences of database in a column level.

In an embodiment, the gathering section may gather co-occurrences by taking communication between remote servers into consideration. In the embodiment, the gathering section may gather a co-occurrence between the first data processing event, which occurred at a first server (e.g., the server computer 5A), and the second data processing event, which occurred at a second server (e.g., the server computer 5B), within a second predetermined number of events after the first data processing event, where the second predetermined number of events that is larger than the first predetermined number.

Figure 6:
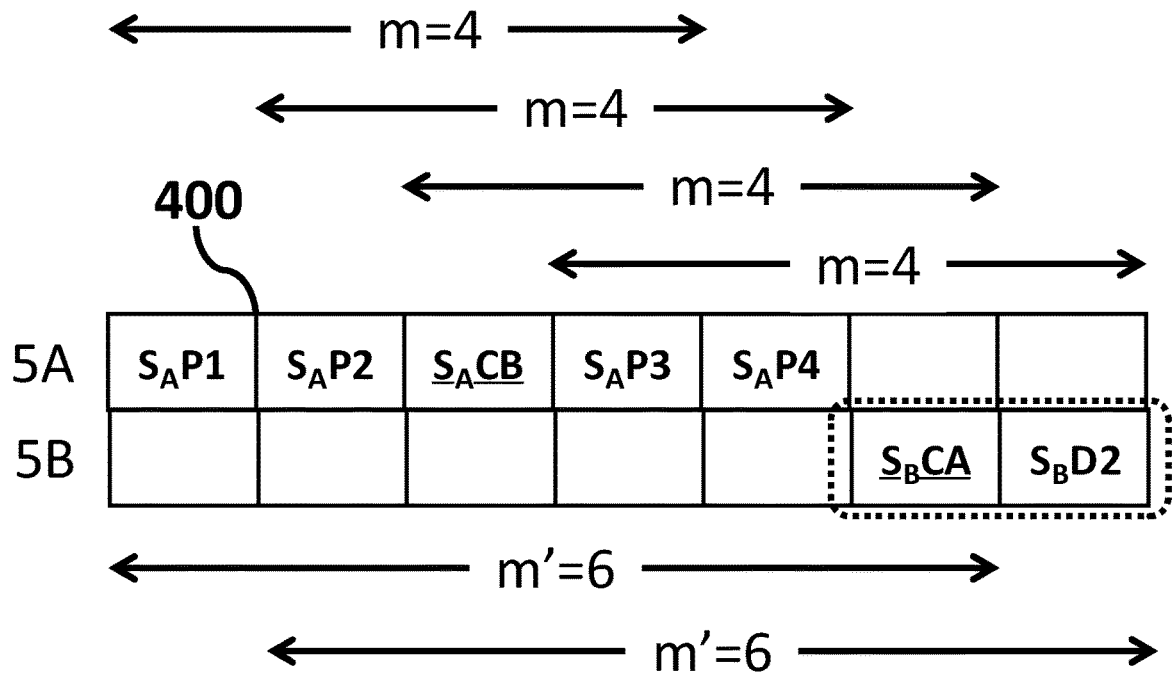
FIG. 6 shows a sequence of data processing events on two servers according to an embodiment of the present invention.

FIG. 6 shows a sequence 400 of data processing events on two servers according to an embodiment of the present invention. FIG. 6 describes the sequence 400 including "$S_AP1$, $S_AP2$, $S_ACB$, $S_AP3$, $S_AP4$, $S_BCA$, $S_BD2$." Here "CB" in "$S_ACB$" represents communication with the server computer 5B, and "CA" in "$S_BCA$" represents communication with the server computer 5A. In the embodiment of FIG. 6, the first predetermined number of events (shown as "m") is 4, and the second predetermined number of events (shown as "m'") is 6.

In an embodiment, the gathering section may adjust the second predetermined number "m'" in accordance with the time of communication between the server computers in the system. For example, the second predetermined number "m'" for a nearby server computer is smaller than the second predetermined number "m'" for a remote server computer.

The second server may be remote from the first server. Data processing by the second server may be delayed due to some reason (e.g., a network delay), although the data processing by the second server can be regarded as co-occurring with the data processing by the first server. According to the embodiment of FIG. 6, the gathering section may gather co-occurrences even despite the delay of communication between servers.

In another embodiment, the gathering section may gather a co-occurrence between a first data processing event, and a second data processing event that occurs within a first predetermined number of events after the first data processing event after moving the second data processing event to an earlier position.

Figure 7:
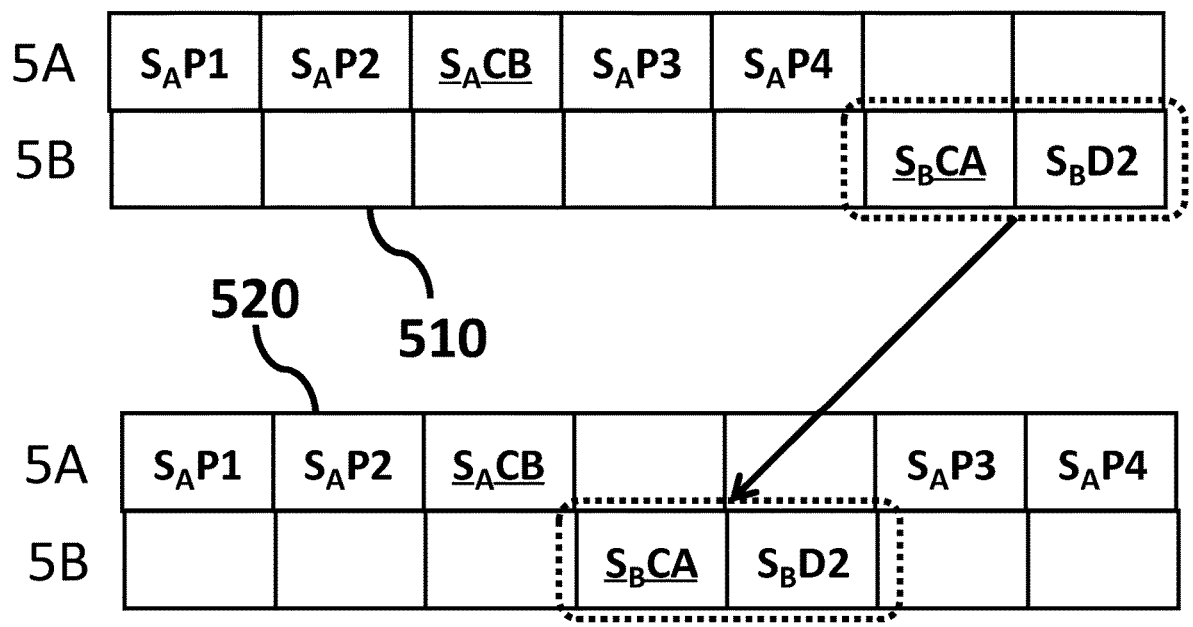
FIG. 7 shows a movement of data processing events according to an embodiment of the present invention.

FIG. 7 shows a movement of data processing events according to an embodiment of the present invention. In the embodiment of FIG. 7, the gathering section may first receive the sequence 510 that is the same as the sequence 400 in FIG. 6. The gathering section may then move the data processing events "$S_B$CA" and "$S_B$D2" of the second server (e.g., the server computer 5B) to an earlier position by a predetermined time or by a predetermined number of events (e.g., 2 events) to generate a modified sequence 520. The gathering section may determine the predetermined time for the movement according to actual network delay recorded by the monitoring section.

Then, the gathering section may gather co-occurrences between the data processing events using the first predetermined number of events (e.g., m=4) based on the modified sequence, such as the sequence 520. Thereby, the gathering section may gather a co-occurrence between "$S_A$P2" and "$S_B$D2" which are initially not within 4 events. According to the embodiment, the gathering section may gather co-occurrences despite the delay of communication between server computers. The gathering section may store the co-occurrences gathered at S150 in the storing section.

In the embodiments related to FIGS. 6 and 7, the monitoring section may monitor and store the communication "$S_A$CB" and "$S_B$CA" between the server computers 5A and 5B at S130, and then the gathering section may gather co-occurrences between the data processing events. Communications such as "$S_A$CB" and "$S_B$CA" may not be treated as the data processing events.

At S170, a generating section, such as the generating section 140, may generate lineages between a plurality of directories based on the amounts of the co-occurrences gathered at S150. In an embodiment, the generating section may generate a lineage between a first directory associated with a first data processing event and a second directory associated with a second data processing event in response to determining that a number of co-occurrences between the first data processing event and the second data processing event exceeds a threshold.

In the embodiment of FIG. 5, the generating section may generate a lineage between "D1" and "D2" associated with a pair of the data processing events "$S_A$D1" and "$S_A$D2", a lineage between "P1" and "D2" associated with a pair of the data processing events "$S_A$P1" and "$S_A$D2", a lineage between "D2" and "P1" associated with a pair of the data processing events "$S_A$D2" and "$S_A$P1", a lineage between "P1" and "P2" associated with a pair of the data processing events "$S_A$P1" and "$S_A$P2", and a lineage between "T1" and "P2" associated with a pair of the data processing events "$S_B$T1" and "$S_A$P2" in response to determine that the number of co-occurrences between these pairs of two data processing events exceeds a threshold of 3.

Figure 8:
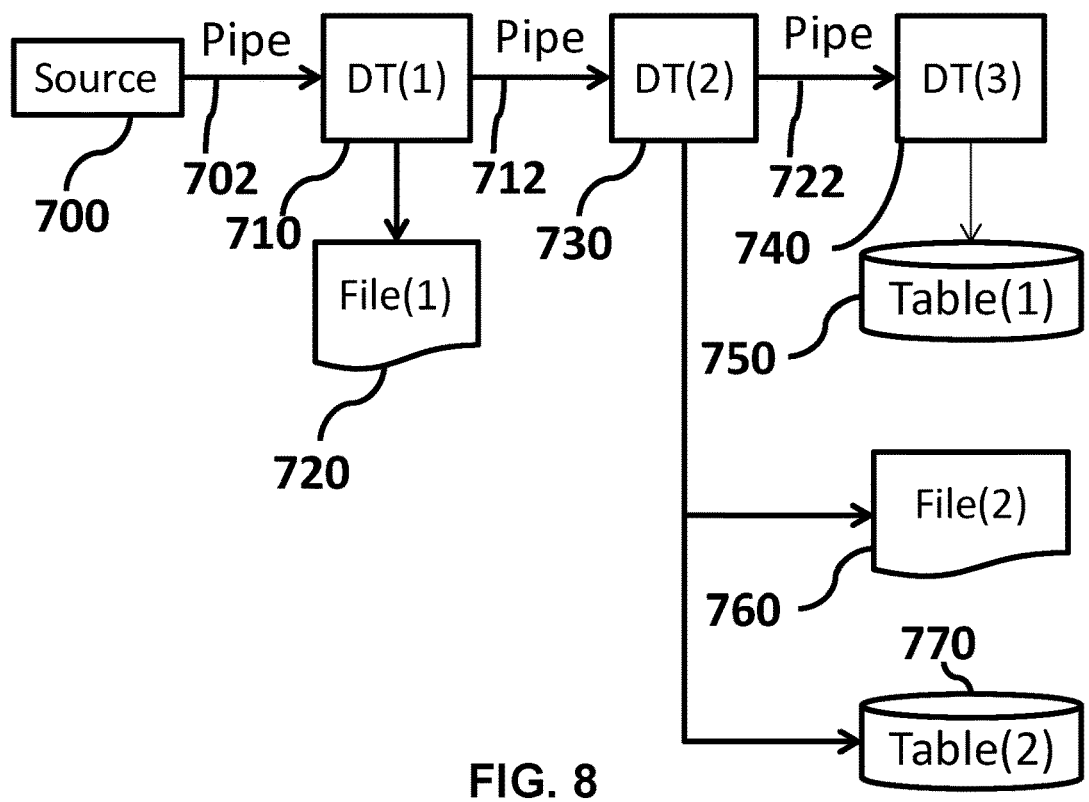
FIG. 8 shows exemplary lineages, according to an embodiment of the present invention.

FIG. 8 shows exemplary lineages, according to an embodiment of the present invention. The lineages shown in FIG. 8 may correspond to the data flow of FIG. 3. As shown in FIG. 8, the generating section may generate directed lineages such that a prior directory is directed to a posterior directory. For example, the data transformer 710 is directed to the file (1) 720 and the data transformer 730. This means that the data transformer 710 (and the pipe 702) is prior to the file (1) 720 and the data transformer 730.

The generating section may generate a lineage between a data transformer 710 and a data transformer 730 from the first data processing event corresponding the data pipe 702 (e.g., P1 of $S_A$P1), and, the second data processing event corresponding the data pipe 712 (e.g., P2 of $S_A$P2). The generating section may generate a lineage between the data transformer 730 and a data transformer 740 from the first data processing event corresponding the data pipe 712 (e.g., P2 of $S_A$P2) and the second data processing event corresponding the data pipe 722 (e.g., P3 of $S_A$P3).

The generating section may generate a lineage between the data transformer 710 and a File (1) 720 from the first data processing event corresponding to the data pipe 702 (e.g., P1 of $S_A$P1) and the second data processing event corresponding to the File (1) 720 (e.g., D1 of $S_A$D1). The generating section may generate a lineage between the data transformer 740 and a Table (1) 750 from the first data processing event corresponding to the data pipe 722 (e.g., P3 of $S_A$P3) and the second data processing event corresponding to the Table (1) 750 (e.g., T1 of $S_A$T1).

The generating section may generate a lineage between the data transformer 730 and a File (2) 760 from the first data processing event corresponding to the data pipe 712 (e.g., P2 of $S_A$P2) and the second data processing event corresponding to the File (2) 760 (e.g., D2 of $S_B$D2). The generating section may generate a lineage between the data transformer 730 and a Table (2) 770 from the first data processing event corresponding to the data pipe 712 (e.g., P2 of $S_A$P2) and the second data processing event corresponding to the Table (2) 770 (e.g., T2 of $S_B$T2).

The generating section may generate a lineage between source data and a directory of the most upstream one or more data processing events. In the embodiment of FIG. 8, the most upstream data processing event is the pipe 702, and thus the generating section may generate a lineage between the source data 700 and the data transformer 710 corresponding to the pipe 702.

In an embodiment, the generating section may generate a lineage for the database in a column level, instead of/in addition to a table level.

When it is possible to generate multiple lineages between one directory and a plurality of other directories, the generating section may generate only one lineage between the one directory and the nearest directory among the plurality of other directories.

Figure 9:
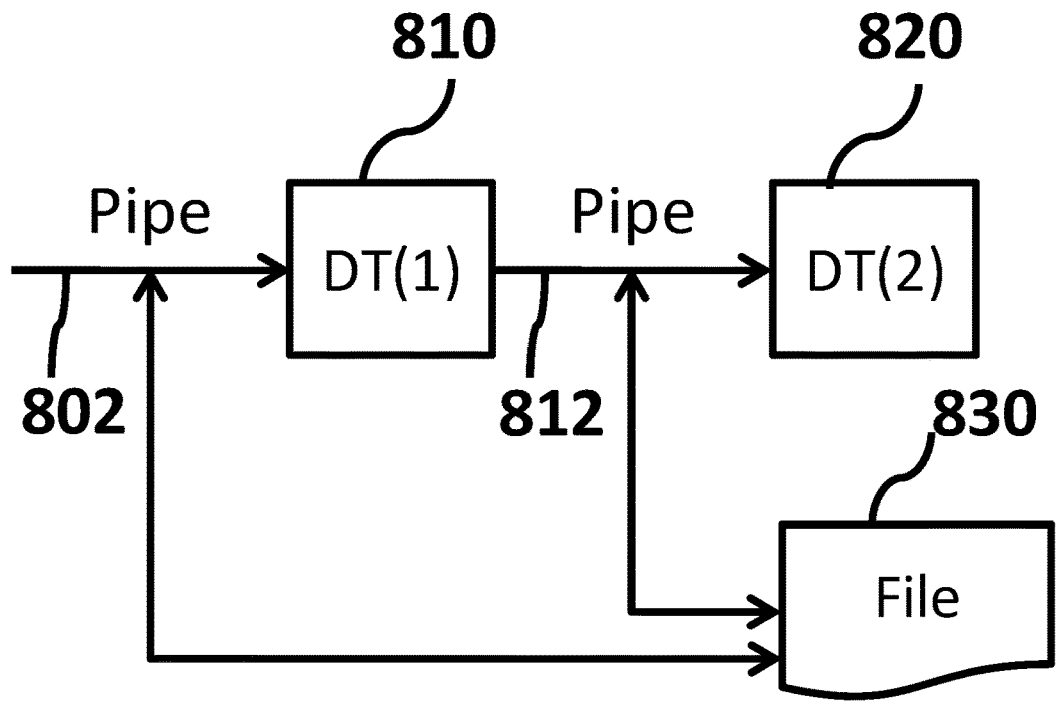
FIG. 9 shows an exemplary step for determining a lineage, according to an embodiment of the present invention.

FIG. 9 shows an exemplary step for determining a lineage, according to an embodiment of the present invention. In an embodiment of FIG. 9, a co-occurrence between a pipe 802 and a file 830 and a co-occurrence between a pipe 812 and a file 830 both exceed the threshold. In this case, the generating section may generate a lineage only between the file 830 and a data transformer 820 (corresponding to the pipe 812), which is closer to the file 830 than a data transformer 810 (corresponding to the pipe 802).

In such embodiments, the generating section may first identify pairs (e.g., a pair of the file 830 and the pipe 802 or a pair of the file 830 and the pipe 812) of a first data processing event (e.g., the file 830) and each of a plurality of second data processing events (e.g., the pipe 802 and the pipe 812). Each pair has a number of co-occurrences that exceeds a threshold.

The generating section may select a pair of data processing events having the smallest average distance among the identified pairs. Then the generating section may generate a lineage between a pair of the directories associated with the data processing events of the selected pair.

For example, the average distance between the pair of the file 830 and the pipe 812 is 2.3 and the average distance between the pair of the file 830 and the pipe 802 is 2.8, the generating section may generate a lineage between the file 830 and the pipe 812 rather than between the file 830 and the pipe 802.

The generating section may store the one or more generated lineages in the storing section.

Data processing by the server computers repeat preliminarily defined pipeline processing by the data transformers, and such defined pipeline processing generally tends to repeat writing and/or reading to the same files and/or the same data tables. According to the embodiments of the present invention, the apparatus may automatically generate lineages with less computational resources by utilizing characteristics of the pipeline processing.

According to the embodiments of the present invention, the apparatus may not need to analyze details of data processing, and thereby may generate lineages faster than a method that analyzes the details of data processing. The apparatus may generate lineages even when processed data is encrypted.

Figure 10:
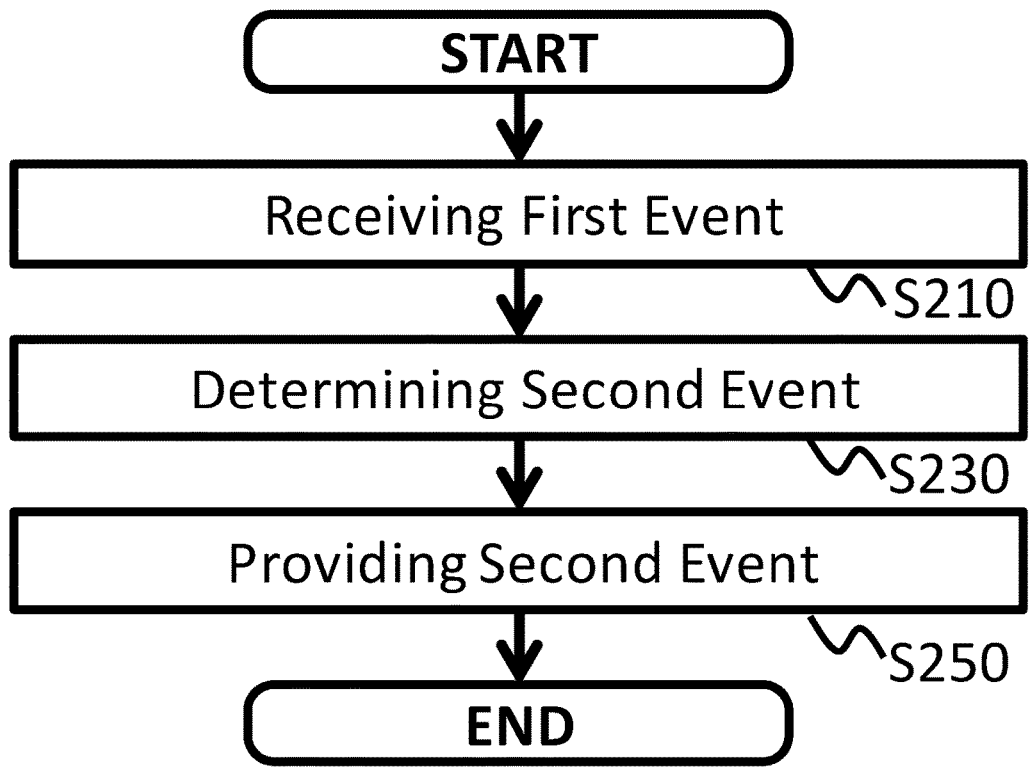
FIG. 10 shows a second operational flow according to an embodiment of the present invention.

FIG. 10 shows a second operational flow according to an embodiment of the present invention. The present embodiment describes an example in which an apparatus, such as the apparatus 10, performs operations from S210 to S250, as shown in FIG. 10 to generate lineages. The apparatus may perform the operations of FIG. 10 after storing lineages at the operation of S170 of FIG. 2.

At S210, a receiving section such as the receiving section 150 may receive a request including an identification of a first directory from a client computer. In an embodiment, the receiving section may receive such a request from a client computer of which the user would like to know which data will be influenced by modifying data related to the first data processing event. For example, the receiving section may receive the identification of table (1) 750 of FIG. 8 as the first directory from the client computer.

At S230, a determining section such as the determining section 160 may identify the lineage related to the first data according to the lineage generated at S170 of FIG. 2. In an embodiment, the determining section may determine one or more second directories that directly and/or indirectly have a lineage with the first directory.

In an embodiment, the determining section may determine the directory that has direct or indirect lineages in all directions (e.g., a downstream direction and an upstream direction in directed lineages) with the first directory, as the second directory. For example when the receiving section receives table (1) 750 as the first directory, the determining section may provide the file (1) 720, the file (2) 760 and the table (2) 770 as the second directories. In the example, the determining section may further provide the data transformers 710, 730 and 740 as the second directories.

In another embodiment, the determining section may determine the directory that has direct or indirect lineages in one direction (e.g., a downstream direction or an upstream direction in directed lineages) with the first directory, as the second directory. For example when the receiving section receives table (1) 750 as the first directory, the determining section may provide the data transformers 710, 730 and 740 as the second directory. The determining section may not provide the file (2) 760 and the table (2) 770 because a direction of the lineage from the table (1) 750 to the data transformers 710, 730, and 750 (upstream) is different from a direction of the lineage from the table (1) 750 to the file (2) 760 and the table (2) 770 (downstream).

At S250, the determining section may provide the second directories that are determined at S230 to the client computer.

Figure 11:
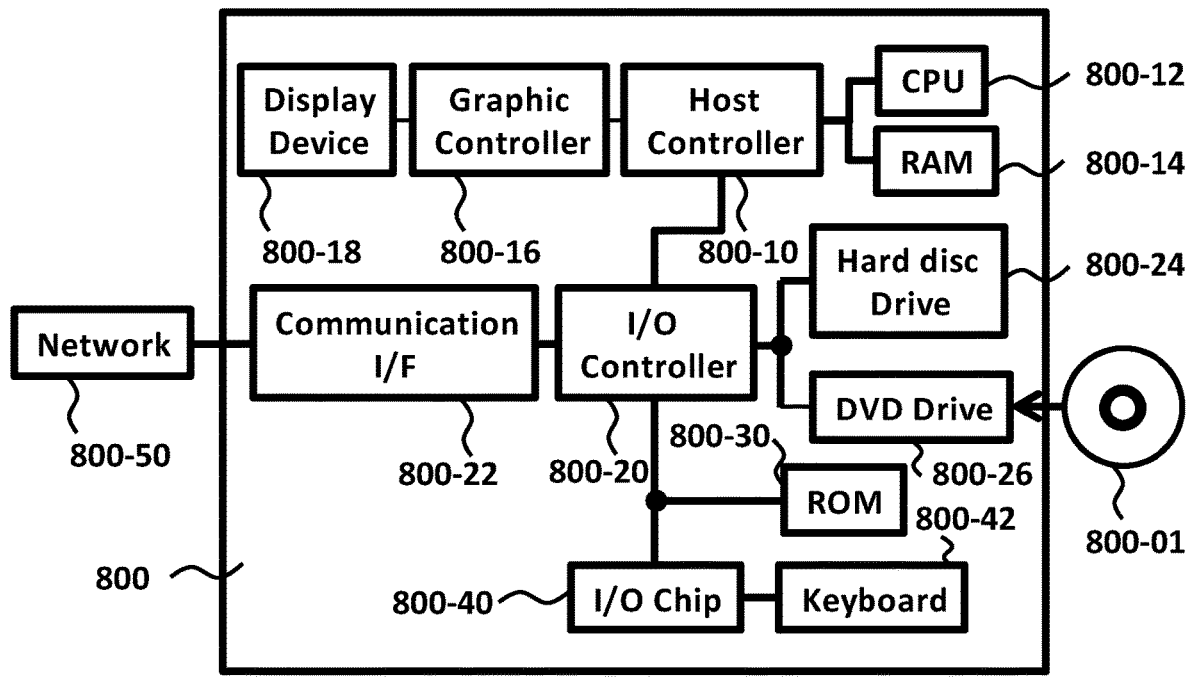
FIG. 11 shows an exemplary hardware configuration of a computer that functions as a system, according to an embodiment of the present invention.

FIG. 11 shows an exemplary hardware configuration of a computer configured for generating lineages, according to an embodiment of the present invention.

A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10.

The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention. The apparatus of the embodiments of the present invention may include the computer readable medium and the processor or programmable circuitry operable to execute the instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable to generate lineages by monitoring and gathering co-occurrences of the data processing events.

What is claimed is:

1. A method of detecting hidden co-occurrence relationships, comprising:
   monitoring a plurality of data processing events on one or more server computers;
   gathering one or more co-occurrences between a plurality of the data processing events, wherein a co-occurrence comprises a data processing event that occurs within a threshold distance of another data processing event, and wherein the distance represents a number of events ordered chronologically and/or represents a period of time; and
   generating a lineage between a first directory associated with a first data processing event and second directory associated with a second data processing event in response to determining that a number of co-occurrences between the first data processing event and the second data processing event exceeds a predetermined threshold.

2. The method of claim 1, wherein the plurality of data processing events comprise at least one of: a writing of data, and a reading of data.

3. The method of claim 1, wherein the plurality of data processing events comprise at least one of: generation of a file, update of a file, reading of a file, update of a database, reading of a database, and use of a data pipe.

4. The method of claim 3, wherein the gathering of co-occurrences between the plurality of the data processing events further comprises:
   counting at least one of the update of the database and the reading of the database for each column of the database.

5. The method of claim 1, wherein the gathering co-occurrences between a plurality of the data processing events further comprises:
   gathering a co-occurrence between a first data processing event, and a second data processing event that occurs within a first predetermined number of events after the first data processing event.

6. The method of claim 5, wherein the second data processing event occurs within the first predetermined number of events and within a predetermined time after the first data processing event.

7. The method of claim 5, wherein
   the first data processing event occurred at a first server, and the second data processing event occurred at a second server within a second predetermined number of events after the first data processing event, and
   the second predetermined number is larger than the first predetermined number.

8. The method of claim 5, wherein the gathering co-occurrences between the first data processing event, and the second data processing event that occurs within the first predetermined number of events after the one data processing event is performed after moving the second data processing event to an earlier position relative to a predetermined time or a predetermined number of events.

9. The method of claim 1, wherein the generating one or more lineages between a plurality of directories associated with the plurality of the data processing events based on the gathered one or more co-occurrences further comprises:
identifying pairs of a first data processing event and each of a plurality of second data processing events, each pair having a number of co-occurrences that exceeds a threshold,
selecting a pair of data processing events having a smallest average distance between the first data processing event and the each of the plurality of second data processing events, among the identified pairs,
generating a lineage between a pair of directories associated with the data processing events of the selected pair.

10. The method of claim 1, further comprising:
storing the one or more generated lineages.

11. The method of claim 10, further comprising:
receiving an identification of a first directory from a client computer;
determining one or more second directories that have a lineage with the first directory; and
providing the second directory to the client computer.

12. An apparatus comprising:
a processor or a programmable circuitry; and
one or more computer readable mediums collectively including instructions that, when executed by the processor or the programmable circuitry, cause the processor or the programmable circuitry to perform operations comprising:
monitoring a plurality of data processing events on one or more server computers;
gathering one or more co-occurrences between a plurality of the data processing events, wherein a co-occurrence comprises a data processing event that occurs within a threshold distance of another data processing event, and wherein the distance represents a number of events ordered chronologically and/or represents a period of time; and
generating a lineage between a first directory associated with a first data processing event and second directory associated with a second data processing event in response to determining that a number of co-occurrences between the first data processing event and the second data processing event exceeds a predetermined threshold.

13. The apparatus of claim 12, wherein the plurality of data processing events comprise at least one of: a writing of data, and a reading of data.

14. The apparatus of claim 12, wherein the plurality of data processing events comprise at least one of generation of a file, update of a file, reading of a file, update of a database, reading of a database, and use of a data pipe.

15. The apparatus of claim 14, wherein the gathering of co-occurrences between the plurality of the data processing events further comprises:
counting at least one of the update of the database and the reading of the database for each column of the database.

16. A computer program product including one or more computer readable storage mediums collectively storing program instructions that are executable by a processor or programmable circuitry to cause the processor or programmable circuitry to perform operations:
monitoring a plurality of data processing events on one or more server computers;
gathering one or more co-occurrences between a plurality of the data processing events, wherein a co-occurrence comprises a data processing event that occurs within a threshold distance of another data processing event, and wherein the distance represents a number of events ordered chronologically and/or represents a period of time; and
generating a lineage between a first directory associated with a first data processing event and second directory associated with a second data processing event in response to determining that a number of co-occurrences between the first data processing event and the second data processing event exceeds a predetermined threshold.

17. The computer program product of claim 16, wherein the plurality of data processing events comprise at least one of: a writing of data, and a reading of data.

18. The computer program product of claim 16, wherein the plurality of data processing events comprise at least one of: generation of a file, update of a file, reading of a file, update of a database, reading of a database, and use of a data pipe.

19. The computer program product of claim 18, wherein the gathering of co-occurrences between the plurality of the data processing events further comprises:
counting at least one of the update of the database and the reading of the database for each column of the database.

* * * * *